United States Patent
Engelhardt et al.

(10) Patent No.: US 8,025,038 B2
(45) Date of Patent: Sep. 27, 2011

(54) CAM FOLLOWER

(75) Inventors: Helmut Engelhardt, Herzogenaurach (DE); Christian Minner, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 231 days.

(21) Appl. No.: 12/445,194

(22) PCT Filed: Oct. 5, 2007

(86) PCT No.: PCT/EP2007/060612
§ 371 (c)(1), (2), (4) Date: Jun. 17, 2009

(87) PCT Pub. No.: WO2008/043717
PCT Pub. Date: Apr. 17, 2008

(65) Prior Publication Data
US 2010/0064999 A1    Mar. 18, 2010

(30) Foreign Application Priority Data
Oct. 12, 2006 (DE) .......................... 10 2006 048 342

(51) Int. Cl.
    *F01L 1/18* (2006.01)
(52) U.S. Cl. ............................................. 123/90.44
(58) Field of Classification Search .............. 123/90.39, 123/90.43, 90.44, 90.45; 29/888.2; 74/559
See application file for complete search history.

(56) References Cited

U.S. PATENT DOCUMENTS

| | | | | |
|---|---|---|---|---|
| 4,697,473 A * | 10/1987 | Patel | | 74/519 |
| 4,825,717 A * | 5/1989 | Mills | | 74/519 |
| 5,048,475 A * | 9/1991 | Mills | | 123/90.39 |
| 5,251,585 A | 10/1993 | Graeber | | |
| 5,799,546 A * | 9/1998 | Pryba | | 74/569 |
| 6,889,643 B2 * | 5/2005 | Motohashi | | 123/90.39 |
| 6,978,750 B2 * | 12/2005 | Yamazaki | | 123/90.39 |
| 7,043,836 B2 * | 5/2006 | Motohashi | | 29/888.2 |
| 7,222,599 B2 * | 5/2007 | Waseda | | 123/90.39 |
| 7,350,489 B2 * | 4/2008 | Engelhardt et al. | | 123/90.39 |
| 2009/0064953 A1 * | 3/2009 | Ikeda et al. | | 123/90.39 |

FOREIGN PATENT DOCUMENTS

| | | |
|---|---|---|
| DE | 196 24 413 A | 1/1998 |
| DE | 196 37 069 A | 3/1998 |
| DE | 197 42 778 A | 4/1999 |
| JP | 07063013 A | 3/1995 |

* cited by examiner

*Primary Examiner* — Thomas Denion
*Assistant Examiner* — Daniel Bernstein
(74) *Attorney, Agent, or Firm* — Lucas & Mercanti, LLP

(57) ABSTRACT

A cam follower for actuating a gas exchange valve of an internal combustion engine, which has a lifting body cold formed from sheet metal and that forms, on a valve-sided lifting section which has two lateral walls and a first base section connecting the walls, a cross-sectional profile which is open towards the gas exchange valve in a U-shaped manner, and on a joint-sided lifting section that has lateral walls and a second base section connecting the walls, a modifiable cross-sectional profile which is initially open towards the gas exchange valve in a U-shaped manner the U-shape adopting a trough shape that has a protruding annular cavity. The trough shape adjacent to an annular cavity on the side of the valve-sided lifting section is M-shaped and has two free recesses open towards the gas exchange valve and extend respectively between one of the lateral walls and the second base section.

5 Claims, 3 Drawing Sheets

CAM FOLLOWER

This application is a 371 of PCT/EP2007/060612 filed Oct. 5, 2007, which in turn claims the priority of DE 10 2006 048 342.1 filed Oct. 12, 2006, the priority of both applications is hereby claimed and both applications are incorporated by reference herein.

FIELD OF THE INVENTION

The invention relates to a cam follower for actuating a gas exchange valve of an internal combustion engine, with an elongate follower body which is cold-formed from sheet metal material and which has, on a valve-side follower portion, a valve actuation surface and, on a joint-side follower portion, a joint socket serving for the pivotably moveable mounting of the cam follower. The follower body forms, on the valve-side follower portion, with two sidewalls proceeding spaced apart from one another, and a first bottom portion connecting the sidewalls, a cross-sectional profile which has a U-shape open toward the gas exchange valve, and the follower body forms, on the joint-side follower portion, in the longitudinal direction oriented from the valve-side follower portion to the joint-side follower portion, with the sidewalls and a second bottom portion connecting the sidewalls, a variable cross-sectional profile which initially has a U-shape open toward the gas exchange valve and a trough shape following said U-shape and having a trough which is closed toward the gas exchange valve and within the longitudinal extent of which the joint socket for the most part or entirely runs.

BACKGROUND OF THE INVENTION

A cam follower of this type will be gathered from JP 07063013 A, considered to be genre-defining, and has, as compared with cam followers, the follower bodies of which over their entire length possess a U-shape open toward the gas exchange valve, several advantages which are critical for the valve drive function. These include, on the one hand, the rigidity of the follower body, which is crucial for the valve drive dynamics and which, in the case of the trough shape, because of the then clearly higher surface moment of inertia, can be increased considerably with a correspondingly lower flexion of the cam follower. On the other hand, on account of this comparatively high surface moment of inertia, there is the possibility of reducing the wall thickness of the follower body to the benefit of a reduced mass moment of inertia and correspondingly lower inertia, contact and friction forces, with the rigidity of the follower body being sufficient as before.

A further advantage of the joint-side cross-sectional profile with a trough shape is the geometric design of the joint socket which at least for the most part runs within the longitudinal extent of the trough and which can surround with a markedly greater overlap angle a joint head arranged stationarily in the internal combustion engine and pivotably moveably supporting the cam follower. This increases the reliability of the cam follower against jumping off from the joint head, such as may occur, for example, in the case of contact losses in the valve drive as a result of excess rotational speeds of the internal combustion engine with correspondingly uncontrolled force angles between the joint socket and the joint head.

However, a substantial disadvantage of the cam follower proposed in the publication mentioned is founded on the practicability of forming the trough shape. This is such there that the sidewalls first ascending in the direction remote from the gas exchange valve merge, bent by 180°, into the second bottom portion which itself has a rectangular U-shape closed toward the gas exchange valve and having legs bearing directly against the sidewalls. However, the production of this trough shape entails an unusually high degree of forming of the follower body cold-formed from sheet metal material, so that, particularly in the transitional region between the U-shape and the following trough shape, from which the second intermediate bottom as it were penetrates between the sidewalls, material cracks in the follower body, and consequently a high reject rate during its production, must be expected. Furthermore, on account of the high notch effect of such a trough shape, there is also the risk of an insufficient fatigue fracture strength of the follower body, the premature fatigue fracture of which leads, as a rule, to considerable damage to the internal combustion engine.

OBJECT OF THE INVENTION

The object on which the invention is based, therefore, is to avoid these outlined disadvantages and thus to provide a cam follower of the type initially mentioned, the follower body of which, on the one hand, can be formed with high process reliability and therefore can be produced cost-effectively, along with the lowest possible failure rate, and, on the other hand, has sufficient operating strength.

SUMMARY OF THE INVENTION

This object is achieved, according to the invention, in that the trough shape adjacent to the joint socket of the valve-side follower portion has an M-shape with two clearances which are open toward the gas exchange valve and which in each case run between one of the sidewalls and the second bottom portion. Accordingly, the precondition necessary for the cost-effective production of the cam follower of the formability of the follower body with high process reliability is afforded in that the degree of forming of the follower body is appropriate, in terms of forming, in the region of the trough shape on account of the clearances and does not overshoot a level with is critical with regard to crack formation. At the same time, on the respective bottom of the clearances, there may be provided a transitional contour, stress-compatible due to a low notch effect, between the sidewalls and the second bottom portion, preferably in the form of sufficiently large bending radii, to the benefit of a sufficient fatigue fracture strength of the follower body. In summary, therefore, by means of a cam follower designed in this way, the functional advantages initially mentioned can be achieved, without the disadvantages arising from the prior art, that is to say material crack formation in the forming of the follower body and the insufficient fatigue fracture strength of the latter, having to be accepted.

In a development of the invention, the follower body with the top sides of the side walls facing away from the gas exchange valve and the second bottom portion, forms a longitudinal sectional profile such that, in the transitional region between the U-shape initially open toward the gas exchange valve and the trough shape following said U-shape, the second bottom portion runs, bent at an angle of at least 45° with respect to the top sides of the sidewalls. As is also made clear by the exemplary embodiment explained further below, as a result of this measure the length of the joint-side follower portion can be kept particularly low, so that, overall, a follower body of extremely compact build in the longitudinal direction and also having increased rigidity and a low mass, can be produced.

This advantageous geometric design of the follower body may also be described, independently of the gradient of the top sides of the sidewalls, in that, in the transitional region between the U-shape first open toward the gas exchange valve and the trough shape following said U-shape, the second bottom portion runs essentially orthogonally with respect to an underside, facing the gas exchange valve, of the joint socket.

Moreover, the clearances are to widen conically toward the gas exchange valve. The clearances thus formed serve not only for the above-explained configuration, compatible with forming and with wear, of the follower body in the region of the trough shape, but also for a good demolding capacity and a high wear resistance of the forming die required for producing the follower body.

Also, there may be provision whereby a longitudinal end face of the first bottom portion, facing the second bottom portion, and a longitudinal end face of the second bottom portion, facing the first bottom portion, delimit a recess which extends between the sidewalls and in which recess is arranged a roller which is rotatable on a bearing bolt fastened to the sidewalls, connecting these, and optionally mounted on a bearing. A roller of this type serves, as is known, as a contact surface which markedly reduces the valve drive friction and which can cooperate not only with a cam of a camshaft, but also with other stroke transmission members, for example in the form of an intermediate lever, arranged between the cam and the cam follower, of a fully variable mechanical valve control. Nevertheless, for weight or cost reasons, there may alternatively be provision whereby the first bottom portion and the second bottom portion form a unit which is uninterrupted in the longitudinal direction and on which a rigid sliding surface for the cam or for the further stroke transmission member runs.

Finally, in the region of the trough shape, the wall thickness of the second bottom portion is to be lower than the wall thickness of the sidewalls. The comparatively low wall thickness of the second bottom portion facilitates, in particular, the process reliability of the shaping of the joint socket which rises out of the trough shape and, moreover, surrounds the joint head to a great extent.

BRIEF DESCRIPTION OF THE DRAWINGS

Further features of the invention may be gathered from the following description and from the drawings in which an exemplary embodiment of a cam follower according to the invention is illustrated and in which.

DETAILED DESCRIPTION OF THE DRAWINGS

Figure 1:
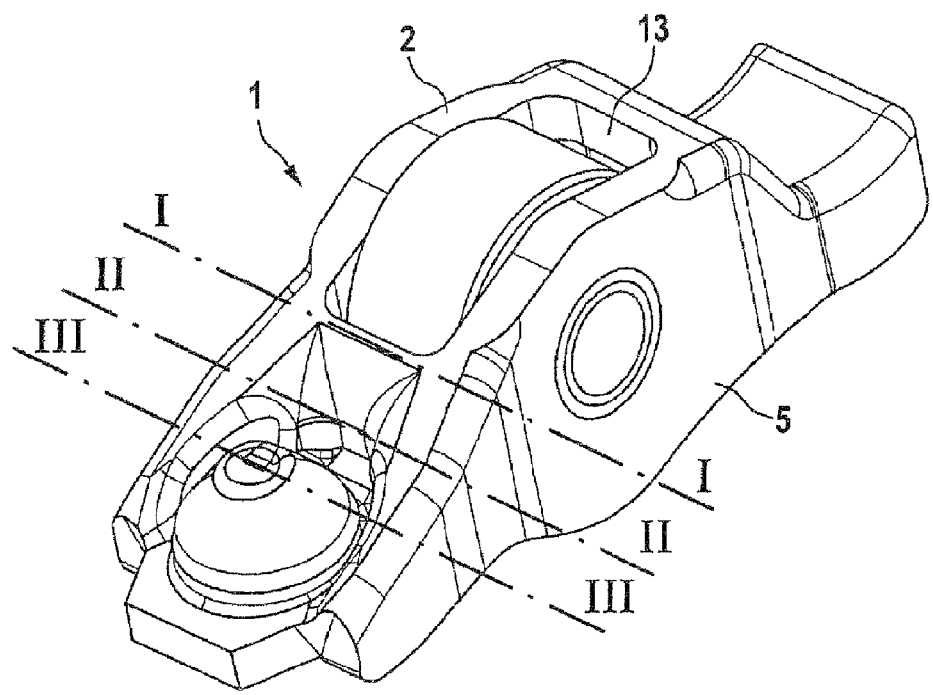
FIG. 1 shows the cam follower according to the invention in a perspective view of the top side facing away from a gas exchange valve actuated by the cam follower.
Figure 2:
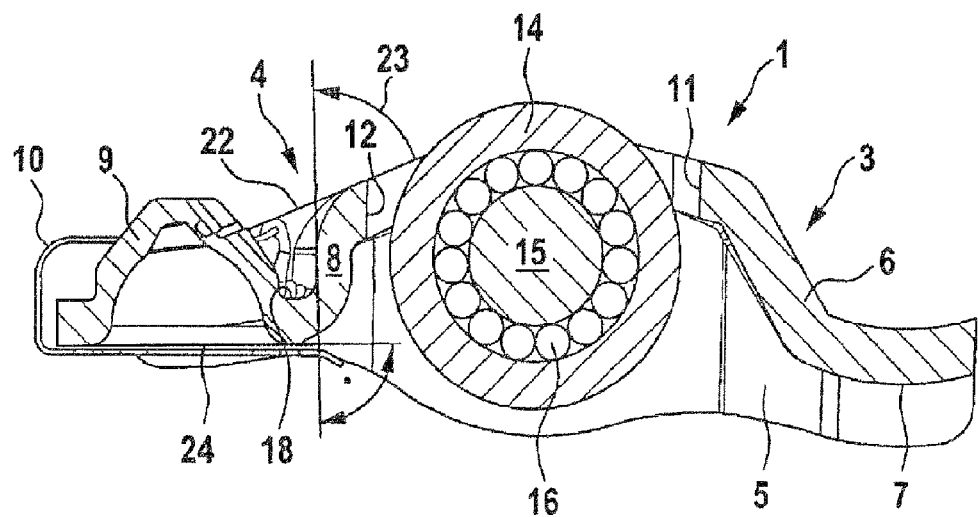
FIG. 2 shows the cam follower according to FIG. 1 in a longitudinal mid-section.

A cam follower 1 for actuating a gas exchange valve, not illustrated here, of an internal combustion engine is disclosed in FIGS. 1 and 2 in a perspective view and in longitudinal mid-section, respectively. The cam follower 1 has an elongate follower body 2 cold-formed from sheet metal material with a valve-side follower portion 3 and a joint-side follower portion 4. The follower body 2 forms, on the valve-side follower portion 3, with two sidewalls 5 proceeding spaced apart from one another, and a first bottom portion 6 connecting the sidewalls 5, a cross-sectional profile with a U-shape which is open toward the gas exchange valve and which loads a valve actuation surface 7 upon the gas exchange valve by way of a stroke and at the same time by means of the sidewalls 5 aligns the cam follower 1 laterally on the gas exchange valve.

The sidewalls 5 are connected to one another at the joint-side follower portion 4 via a second bottom portion 8. Out of the latter rises a joint socket 9, by means of which the cam follower 1 is mounted pivotably moveable on a joint head, likewise not illustrated. As is known, such a joint head is conventionally part of a supporting element arranged stationarily in the internal combustion engine having mechanical or hydraulic valve clearance compensation, a connecting element 10, illustrated only in FIG. 2, serving for the captive retention of the cam follower 1 on the supporting element during transport and mounting of the structural unit thus formed.

A longitudinal end face 11 of the first bottom portion 6, facing the second bottom portion 8, and a longitudinal end face 12 of the second bottom portion 8, facing the first bottom portion, delimit a recess 13, proceeding between the sidewalls 5, for a rotatable roller 14 for reducing the valve drive friction. In this exemplary embodiment, the roller 14 is arranged, mounted on a bearing by means of a needle bearing 16, on a bearing bolt 15 fastened to the sidewalls 5 and connecting these.

Figure 3:
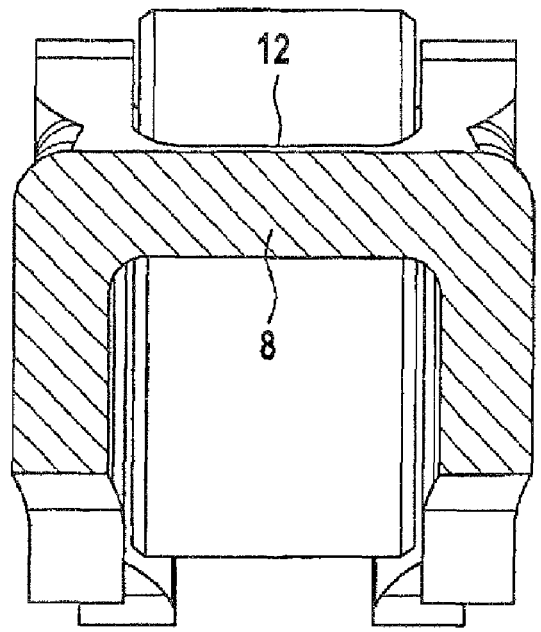
FIG. 3 shows the cross section I-I according to FIG. 1.
Figure 4:
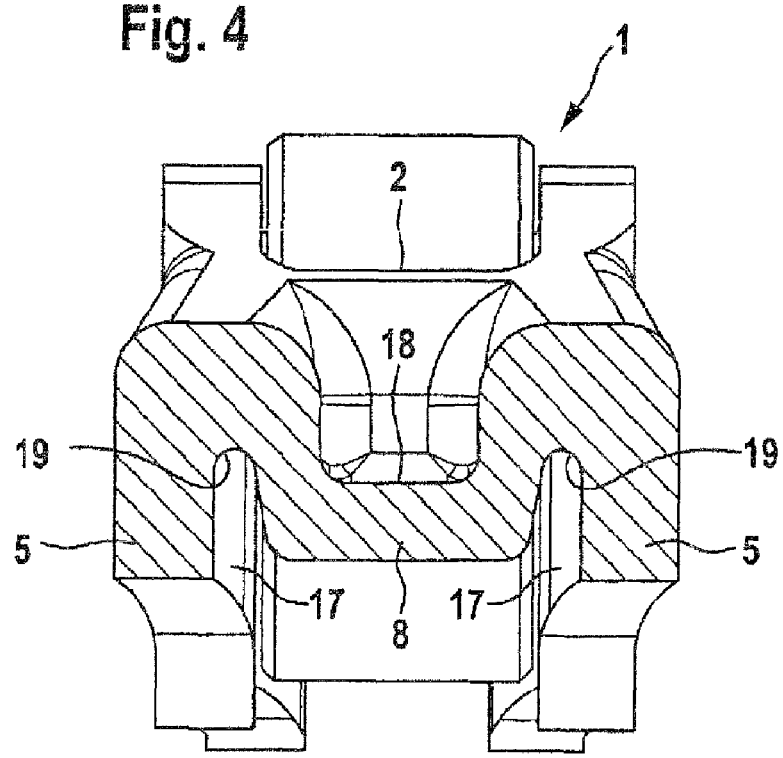
FIG. 4 shows the cross section II-II according to FIG. 1.
Figure 5:
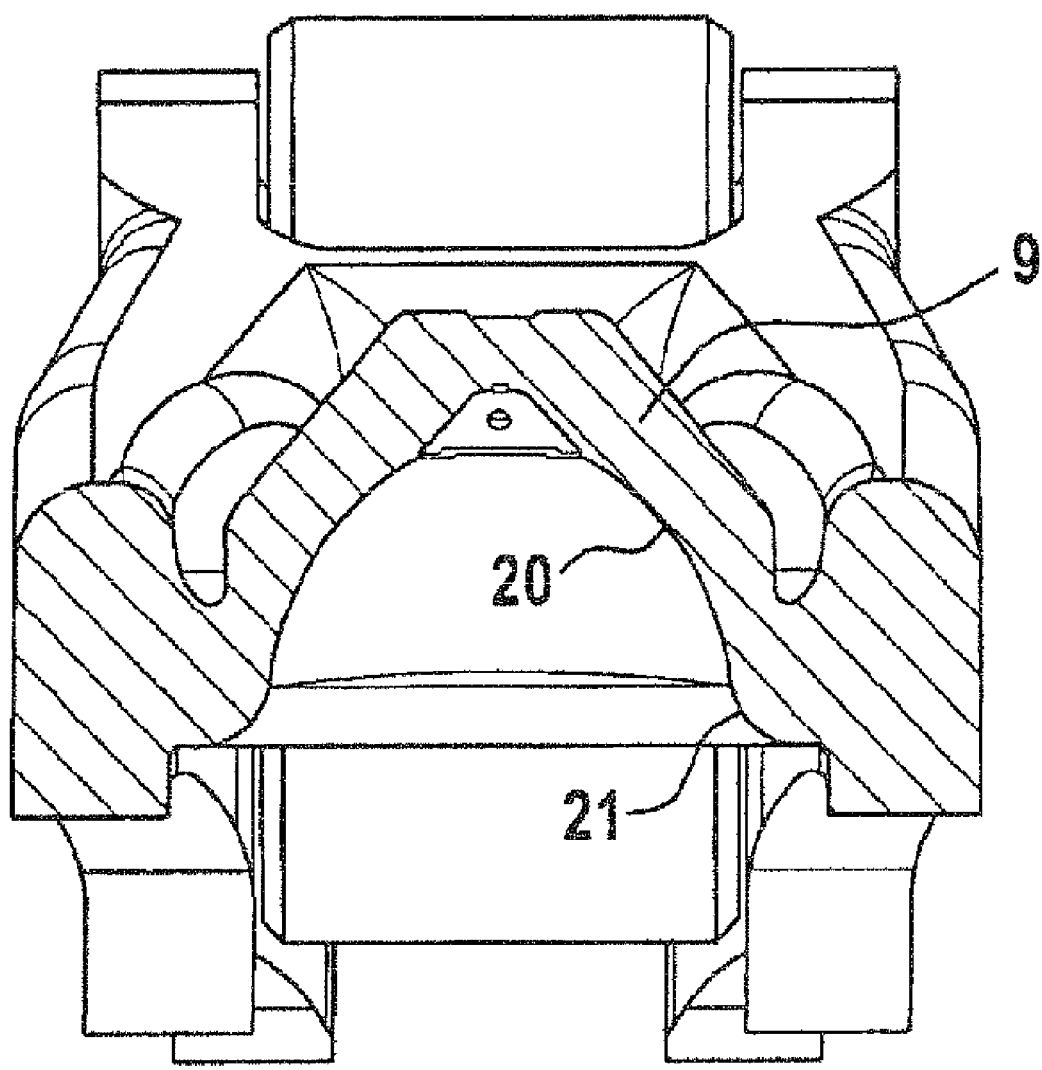
FIG. 5 shows the cross section according to FIG. 1.

As compared with the valve-side cross-sectional profile having a U-shape which is continuous in the longitudinal direction, the follower body 2 has a variable cross-sectional profile on the joint-side follower portion 4. This variable cross-sectional profile is explained below with reference to the sections I-I to III-III according to a FIG. 1 which are illustrated in FIGS. 3 to 5. As may be gathered from FIG. 1, the order of these sections corresponds to a longitudinal direction, oriented from the valve-side follower portion 3 to the joint-side follower portion 4, of the follower body 2. The cross-sectional profile illustrated in FIG. 3, corresponding to the section I-I positioned in the immediate vicinity of the longitudinal end face 12 of the second bottom portion 8, has, like the valve-side follower portion 3, a U-shape open toward the gas exchange valve. As becomes clear from FIG. 4, corresponding to the section II-II, this U-shape merges into a trough shape adjacent to the joint socket 9 at the valve-side follower portion 3. This trough shape has an M-shape with two clearances 17 which are open toward the gas exchange valve and which in each case run between one of the sidewalls 5 and the second bottom portion 8, and also a trough 18 closed toward the gas exchange valve. As explained initially, the clearances 17 compatible with metal forming serve for the production of the follower body 2 with high process reliability, in that the degree of forming of the latter lies at a level which is uncritical with regard to production-induced material cracks. At the same time, the bending radii 19 running at the bottom of the clearances 17 ensure a low notch effect to the benefit of a sufficient fatigue fracture strength of the follower body 2 while the cam follower 1 is in operation. Moreover, on account of the clearances 17 widening conically toward the gas exchange valve, the forming die for producing the trough shape can have a sufficiently stable and wear-resistant design.

Furthermore, it can be seen in FIG. 4 that, in the region of the trough shape, the wall thickness of the second bottom portion 8 is markedly lower than the wall thickness of the sidewalls 5. As a result, the joint socket 9, which is illustrated in FIG. 5 according to the section III-III and which is drawn, with an annular collar 21 following below its dome-shaped formed portion 20, around the joint head of the supporting element to a great extent, can be formed into the second bottom portion 8 with a high degree of forming.

Finally, as becomes clear from the longitudinal section, illustrated in FIG. 2, of the cam follower 1, the follower body 2 forms, with its top sides 22 of the sidewalls 5, facing away from the gas exchange valve, and the second bottom portion 8, a longitudinal sectional profile, such that, in the transitional region between the U-shape initially open toward the gas exchange valve and the trough shape following said U-shape, the second bottom portion 8 proceeds, bent at an angle 23 of at least 45°, with respect to the top sides 22 of the sidewalls 5. The angle 23, selected in this exemplary embodiment, of about 65°, has the result that the trough 18 drops down with the second bottom portion 8 especially steeply at this point, to be precise orthogonally with respect to an underside 24, facing the gas exchange valve, of the joint socket 9. As a result, taking into account the construction space requirement of the joint socket 9, the length of the joint-side follower portion 4 can be kept extremely small. Consequently, a follower body 2, which overall has a highly compact build in the longitudinal direction and, furthermore, has increased rigidity and a correspondingly low mass effect, can also be produced.

LIST OF THE REFERENCE NUMERALS

1 cam follower
2 follower body
3 valve-side follower portion
4 joint-side follower portion
5 sidewall
6 first bottom portion
7 valve actuation surface
8 second bottom portion
9 joint socket
10 connecting element
11 longitudinal end face of the first bottom portion
12 longitudinal end face of the second bottom portion
13 recess
14 roller
15 bearing bolt
16 needle bearing
17 clearance
18 trough
19 bending radius
20 formed portion
21 annular collar
22 top side of the sidewall
23 angle
24 underside of the joint socket

The invention claimed is:

1. A cam follower or actuating a gas exchange valve of an internal combustion engine, comprising:

an elongate follower body, which is cold-formed from sheet metal, having a valve-side follower portion, a joint-side follower portion, and two sidewalls with inner faces transversely spaced apart from each other and connected to each other at the valve-side follower portion and the joint-side follower portion, the valve-side follower portion has a valve actuation surface and a first bottom portion extending from the valve actuation surface and a first end face extending transverse between the two side faces, and the joint-side follower portion has a joint socket for pivotably movably mounting of the cam follower and a second bottom portion with a second end face extending transverse between the two side faces, the joint-side follower portion has a variable cross-sectional profile with a U-shape taken along the second end face of the second bottom portion, the U-Shape merges into an M-Shape adjacent to the joint socket, the M-shape has a trough formed between two sidewalls and the clearances formed on the inner faces of the sidewalls, which widen conically toward the gas exchange valve and which extend at least partially between each of the sidewalls and the second bottom portion.

2. The cam follower as claimed in claim 1, wherein the sidewalls have top sides facing away from the gas exchange valve and the second bottom portion and the follower body forms, with the top sides of the sidewalls, a longitudinal sectional profile such that, in a transitional region between the the cross-sectional profile of the joint-side follower portion, the second bottom portion is bent at an angle of at least 45° with respect to the top sides of the sidewalls.

3. The cam follower as claimed in claim 1, wherein the joint socket has an underside facing the gas exchange vale and the second bottom portion has a longitudinal sectional profile such that, in a transitional region, between the as exchange valve and the trough shape following U-shape the M-shape, the second bottom portion runs orthogonally with respect to the underside of the joint socket.

4. The cam follower as claimed in claim 1, wherein a recess is formed between the sidewalls and is delimited by the first longitudinal end face of the first bottom portion and the second longitudinal end face of the second bottom portion, and in the recess is a roller which is rotatable on a bolt that is fastened to the sidewalls via a bearing arranged between the roller and the bolt.

5. The cam follower as claimed in claim 1, wherein, in a region of the M-shape, a wall thickness of the second bottom portion is less than a wall thickness of the sidewalls.

* * * * *